Patented Oct. 24, 1922.

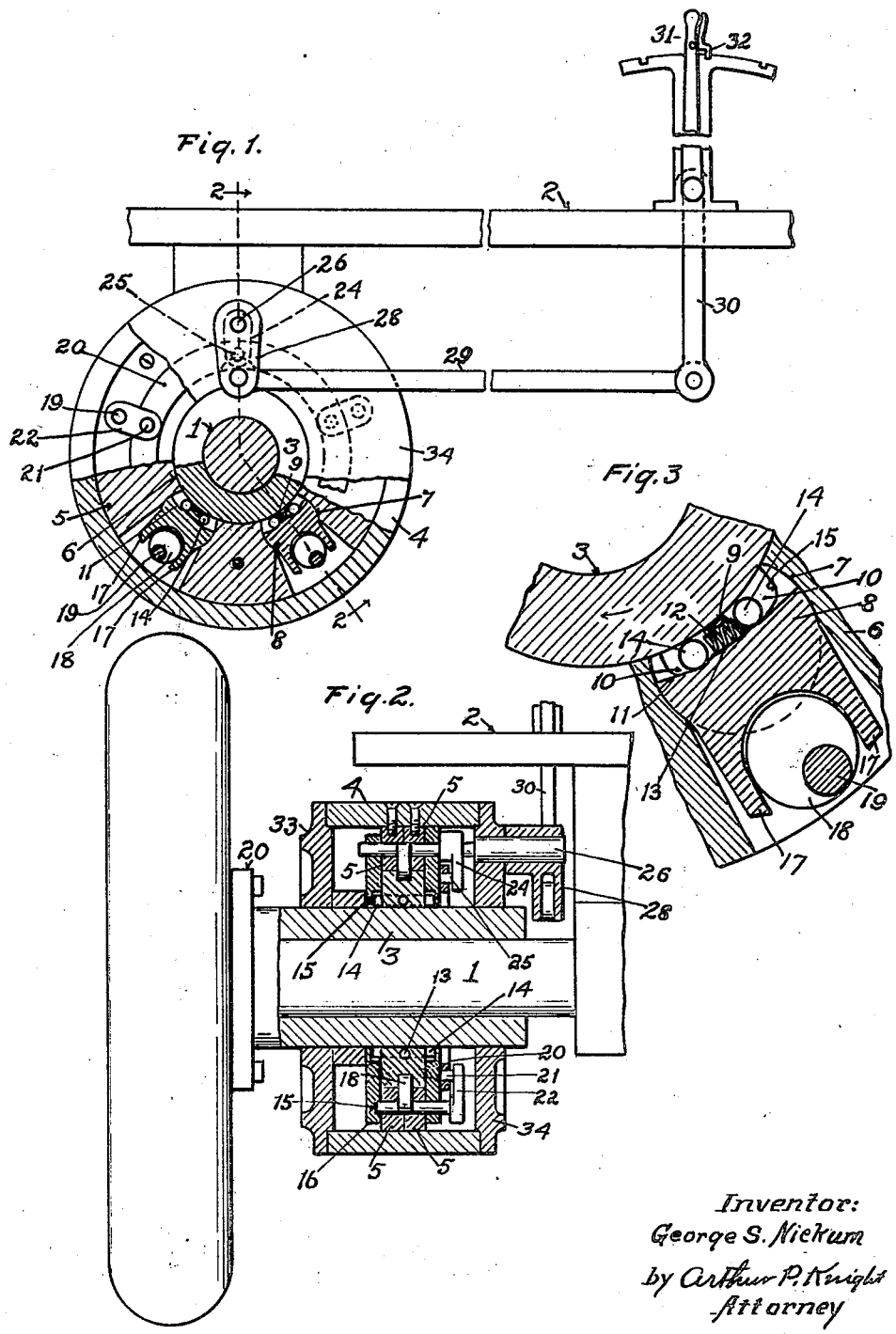

1,433,220

UNITED STATES PATENT OFFICE.

GEORGE S. NICKUM, OF GLENDALE, CALIFORNIA.

BRAKING DEVICE.

Application filed June 20, 1921. Serial No. 478,856.

*To all whom it may concern:*

Be it known that I, GEORGE S. NICKUM, a citizen of the United States, residing at Glendale, in the county of Los Angeles and State of California, have invented a new and useful Braking Device, of which the following is a specification.

This invention relates to means for braking motor vehicles, or other machines, and the main object of the invention is to provide improved means for controllably arresting the movement of the vehicle, or machine, in one direction while permitting it to move in the opposite direction.

A further object of the invention is to provide means for the said purpose which will permit of the braking action being applied in such manner as to arrest the movement of the machine or simply to retard the same.

The accompanying drawings illustrate an embodiment of my invention, and referring thereto:

Fig. 1 is a side elevation of the braking device, partly in section;

Fig. 2 is a section on line 2—2 in Fig. 1;

Fig. 3 is a detailed section of a braking dog.

In the drawings my invention is shown as applied to an axle 1 of a motor truck, or other vehicle, 2 indicating a portion of the frame or chassis of said vehicle on which said axle is mounted in the usual bearings. A cylindrical sleeve 3 is rigidly connected to wheel 20 mounted on said axle and is adapted to engage on its peripheral surface with the braking devices hereinafter described. Said braking devices are mounted within a cylindrical casing comprising a ring 4 and end plates 33 and 34. Said ring 4 is provided with inwardly extending flanges or rings 5 rigidly secured thereto and to each other, said flanges or rings being formed with a cylindrical bore 6 fitting on the sleeve 3 aforesaid and provided with cylindrical recesses 7 extending outwardly from said bore and adapted to receive the braking devices 8. Each braking dog 8 is formed as a cylinder fitting in the corresponding recess 7 and cut away at the side adjacent to the sleeve 3 and is provided at said cut away portion with a rib 9 and a recess 10 on each side of said rib, said recess being deepest adjacent to said rib and the bottom of said recess sloping toward the sleeve 3 as it recedes from said rib, so as to provide an inclined plane surface or wedging face 11 to produce a wedging action as hereinafter set forth. A helical spring 12 is mounted in a recess 13 in rib 9 and rollers 14 are provided in the respective recesses 10 and are engaged by said spring to force said rollers apart. The dog 8 may be of the same length as the thickness of the two ring members 5 and the rollers 14 preferably extend beyond said dog at each end so as to project into slots 15 in rings 16 which are secured to the rings 5 aforesaid, so as to retain said rollers in proper radial position, said slot 15 being, however, of such dimensions as to permit the movement of the rollers necessary for the wedging and releasing actions hereinafter referred to. Each dog 8 is further provided with lugs 17 for engaging an eccentric 18 mounted on a pin or shaft 19 so as to cause the dog to be turned one way or the other by partial rotation of said shaft or pin. The several shafts or pins 19 are connected to move in unison by means of an operating ring 20 pivotally engaging pins 21 on the arms 22 carried by the respective shafts or pins 19. Said operating ring 20 is operated by an arm 24 pivotally engaging therewith by pin 25, said arm being carried by a shaft 26 mounted in the rings 5 aforesaid and connected to a controlling lever to control the operation of the brake. For example, said shaft 26 may carry an arm 28 connected by rod 29 to a lever 30 mounted on the frame or body of the car in any suitable manner and having an operating handle 31 and locking means 32 whereby it may be locked in neutral, forward brake or reverse brake position.

The operation is as follows:

In normal or released position, as shown in Fig. 1, the operating lever 30 is so placed that through the members 29, 28, 26, 24 and 20 it holds the shafts 19 in position to maintain the dogs 8 with their recesses 10 symmetrically placed with reference to the braking sleeve 3. In this position the wedging faces of the recesses 10 extend substantially parallel to the periphery of the braking sleeve 3 so that there is no gripping action in either direction of the rotative movement of the sleeve 3 within the dogging devices. Assuming that the vehicle is standing on a grade or hill-side facing uphill and that it is desired to prevent downward movement of the vehicle while permitting its free upward movement, the lever 30 may be operated so as to act through the aforementioned parts to bring dogs 8 to the position shown in Fig. 3, the shafts 19, operating through the eccentrics 18, engaging the lugs 17 on each dog 8 to turn said dog slightly within the cylindrical recess 6 so as to cause the wedging face 11 of the recess 10 on one side of said dog to move toward the member 3 while the corresponding wedging face on the other side moves away from said member 3. The result of this operation is that the side that is moved toward the member 3 presents a runway for the gripping rollers 14 which tapers or converges in the direction of motion of the sleeve 3, in case the vehicle starts to move backwardly, so that such motion of the sleeve 3 will roll the rollers 14 within this converging runway and cause it to be gripped between the sleeve 3 and the wedging face 11 aforesaid. The spring 12 serves to ensure initial engagement of the roller with these gripping faces. While rearward movement of the vehicle is thereby prevented, it is possible to start up the vehicle without resistance from the brake, the gripping devices above described instantly releasing on forward movement of the vehicle.

In case it is desired to arrest or retard the forward movement of the vehicle the lever 30 is moved in the opposite direction, to tip or turn the dogs 8 reversely and cause them to grip in the forward motion of the sleeve 3. This gripping or braking action may be varied by varying the extent of motion of the controlling lever 30 so as to turn the dogs 8 to a greater or less extent and correspondingly increase or diminish the gripping action on the rollers 14 on the advance side of the dog.

It is to be understood that the casing or housing 4 will be mounted on or connected with any suitable supporting means, for example, the differential or rear axle housing, so as to prevent the same from turning, and the connection between the lever 30 and the lever 28 will be such as to permit of the usual vertical movement of the chassis relative to said housing.

My invention is also applicable to the braking of other machines, for example, hoists, or stationary engines, in which it is desired to arrest or retard the movement of the rotative shaft or member.

What I claim is:

1. A braking device comprising a rotative braking member provided with a cylindrical surface, means extending around said braking member and provided with dogs rotatively mounted therein, said dogs having recesses formed with wedging faces opposing the cylindrical surface of said braking member, means for effecting partial rotation of said dogs to cause said wedging face thereof at one side of the dogs to approach said cylindrical surface and the wedging face at the other side of said dogs to recede from said cylindrical surface, and rolling devices mounted on said recesses and adapted to be gripped between the said cylindrical surface of the braking member and the wedging face of each dog when such wedging face is moved toward said gripping surface.

2. A braking means comprising a cylindrical rotatably mounted brake member, a casing extending around said cylindrical member and provided internally with cylindrical recesses forming bearings, dogs having cylindrical surfaces engaging said recesses to rotatably support said dogs, each dog being provided with two roller receiving recesses having wedging faces, rollers mounted in the respective recesses and adapted to be gripped between said wedging faces and the cylindrical brake member and operating means for imparting partial rotation to said dogs to cause the wedging face at one side of said dog to approach said cylindrical brake member to grip the roller at that side and the wedging face at the opposite side of each dog to recede from the cylindrical brake member to release the roller at that side.

3. Braking means, as set forth in claim 2, in which said operating means for the said dogs comprises a plurality of shafts having eccentrics engaging said dogs to return the same, said shafts having operating arms, a ring pivotally connected to said operating arms, a pivotally mounted arm connected to operate said ring and a lever connected to operate the last named arm and provided with means for locking it in normal position and in position at either side of said normal position for causing the operation of the braking means in either forward or reverse movement of said rotatably mounted cylindrical brake member.

In testimony whereof I have hereunto subscribed my name this 10th day of June 1921.

GEORGE S. NICKUM.

Witnesses:
  WILLIAM A. GOSS,
  R. F. KITTERMAN.